United States Patent [19]

Bovo et al.

[11] 4,081,611
[45] Mar. 28, 1978

[54] COUPLING NETWORK FOR TIME-DIVISION TELECOMMUNICATION SYSTEM

[75] Inventors: Amilcare Bovo; Giampaolo Gubertini; Luigi Musumeci, all of Milan; Giuseppe Valbonesi, Settimo Milanese (Mi), all of Italy

[73] Assignee: Societa Italiana Telecomunicazioni SIEMENS S.p.A., Milan, Italy

[21] Appl. No.: 676,621

[22] Filed: Apr. 13, 1976

[30] Foreign Application Priority Data

Apr. 14, 1975 Italy .............................. 22279 A/75

[51] Int. Cl.² ............................................. H04J 3/02
[52] U.S. Cl. ............................ 179/15 AT; 179/15 BF
[58] Field of Search ......... 179/15 AT, 15 AQ, 15 BF

[56] References Cited

U.S. PATENT DOCUMENTS

| 3,430,144 | 2/1969 | Murakami et al. | 179/15 BF X |
|---|---|---|---|
| 3,458,659 | 7/1969 | Sternung | 179/15 AQ |
| 3,603,736 | 9/1971 | Morroll | 179/15 BF |
| 3,851,105 | 11/1974 | Regnier et al. | 179/15 AT |
| 3,920,914 | 11/1975 | Regnier et al. | 179/15 AT |
| 3,920,921 | 11/1975 | Pitroda et al. | 179/15 BF |
| 3,956,593 | 5/1976 | Collins et al. | 179/15 AQ |

Primary Examiner—Thomas W. Brown
Attorney, Agent, or Firm—Karl F. Ross

[57] ABSTRACT

A coupling network at the junction of several multichannel TDM/PCM links comprises a pair of switching networks each including a set of input group units receiving incoming messages from respective PCM links, a set of output group units transmitting outgoing messages to respective PCM links, and a switching matrix interconnecting the two sets of group units. The bits of a code word representing an incoming message sample, arriving at a line unit individually associated with the respective PCM channel, are delivered to the corresponding input group unit during a receiving period, are read out during a transfer interval via the switching matrix to the output group unit for which they are intended, and are thence fed to the proper line unit during a transmitting period. The two switching networks are identical and have their input and output group units connected to all the line units; a processor, controlling the establishment of interchannel connections through the switching matrix of either of these networks, designates one of them as a master and the other as a slave for standby purposes. A coordinating unit, connected to the output group units of both switching networks (or of corresponding subdivisions thereof), checks on the correlation of their operations and transmits error signals to the processor in the absence of such correlation; this coordinating unit also controls, in response to instructions from the processor, possible changeover from one switching network to the other in the event of a malfunction.

17 Claims, 8 Drawing Figures

COUPLING NETWORK FOR TIME-DIVISION TELECOMMUNICATION SYSTEM

FIELD OF THE INVENTION

Our present invention relates to a coupling network for exchanging messages (voice and/or data) between intercommunicating channels of a plurality of multichannel time-division-multiplex (TDM) links, more particularly groups of pulse-code-modulation (PCM) channels, in a telephone or other telecommunication system.

BACKGROUND OF THE INVENTION

Multichannel PCM links, carrying messages between central-office terminals each serving a multiplicity of subscriber lines, are known for example from commonly owned U.S. Pat. No. 3,928,725. In such a system, only a limited number of message channels can be accommodated by a single link or signal path; thus, in order to facilitate communication between a large number of subscribers, additional links must be made available, together with a higher-ranking coupling network enabling the transfer of message samples from any channel of one link to any channel of another (or possibly the same) link. Such an inter-link coupling network could also be used to permit the exchange of messages between subscribers served by more than two central offices.

OBJECTS OF THE INVENTION

Thus, it is an object of our present invention to provide a coupling network of this nature which can be placed at a common junction, or node, of several multichannel TDM links for establishing temporary connections between any two channels allotted to a calling and a called line of a telecommunication system.

A more particular object is to provide a coupling network for the purpose set forth which can be conveniently expanded to accommodate additional subscriber lines served by the same or other central offices. Another important object of our invention is to provide means in such a coupling network for insuring continuity of message transmission in the event of a malfunction of its internal circuitry.

SUMMARY OF THE INVENTION

A coupling network according to our present invention, located at a point of convergence of a plurality of multichannel TDM lines, comprises a multiplicity of line units divided into a plurality of groups respectively associated with the several TDM links, each line unit communicating with a respective channel of the associated link for exchanging incoming and outgoing message samples therewith during a recurrent time slot assigned to the respective channel. All the line units associated with a link are connected to an input group unit and to an output group unit individual to that link. Incoming message samples from the channels of any link, temporarily stored in the associated input group unit, are forwarded during a transfer interval to an output group unit for temporary storage and subsequent transmission, as outgoing message samples, over one of the channels of the link associated with the latter unit (which in some instances could be the same link from which the incoming message samples were received). This transfer of message samples takes place by means of a switching matrix responsive to routing instructions from a processor which stores the addresses of the calling and called lines together with other pertinent information, e.g., as described in commonly owned U.S. Pat. No. 3,828,136.

Thus, the message samples undergo a first temporal shift in the input group unit between reception from the incoming TDM channel and readout to the switching matrix, a spatial transfer in that matrix, and a second temporal shift in the output group unit between that transfer and transmission via the outgoing TDM channel. Generally, each channel operates bidirectionally and thus acts alternately in a transmitting and in a receiving capacity; each channel may therefore be assigned two phases or time slots in a frame for transmission and reception, respectively, with odd-numbered phases used for the transfer of message samples from a calling to a called subscriber line and even-numbered time slots employed for the transfer from called to calling lines.

Advantageously, pursuant to another feature of our invention, the sets of input and output group units with intervening switching matrix are duplicated in two substantially identical switching networks, either of which can be selected by the processor as a master while the other operates synchronously therewith but ineffectually as a slave or standby. With the aid of one or more coordinating units, controlled by the processor, the transfer path is completed through the selected switching network but is interrupted at the standby network, preferably by disconnecting the output group units of the latter from the associated line units. With each line unit connected in parallel to a pair of associated input group units in the two switching networks, a changeover from one of these networks to the other can be carried out instantly upon the detection of a malfunction in the selected master network.

If desired, these switching networks may be subdivided into modular sections whose number may be increased (or reduced) according to need. In that case, at least one coordinating unit should be provided for each pair of corresponding network sections.

BRIEF DESCRIPTION OF THE DRAWING

The above and other features of our invention will now be described in detail with reference to the accompanying drawing in which.

SPECIFIC DESCRIPTION

Figure 1:
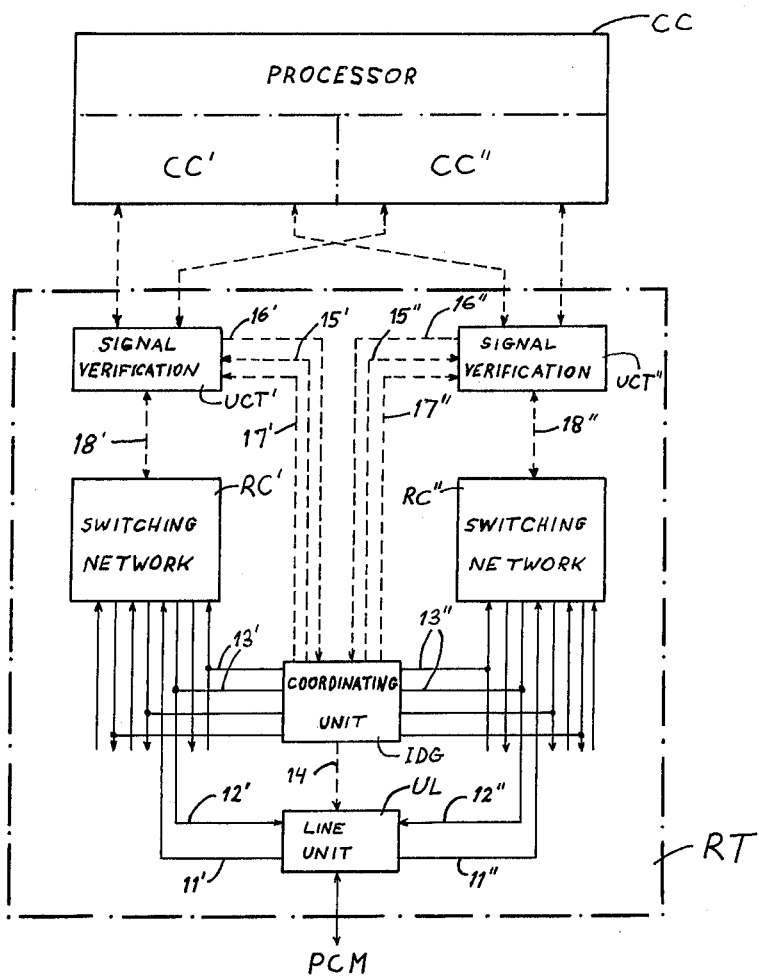
FIG. 1 is a block diagram of a coupling network embodying our invention.

In FIG. 1 we have shown the overall layout of a coupling network RT according to our invention, controlled by a central processor CC of the above-discussed type having two subdivisions CC' and CC". Network RT lies at a junction of a multiplicity of PCM/TDM channels grouped in a plurality of multichannel PCM links. Each of these links consists of $m$ channels designated $PCM_{jl}$–$PCM_{jm}$ and $PCM_{kl}$–$PCM_{km}$ for two such links indicated at $LK_j$, $LK_k$ in FIG. 2. Each channel communicates with an individual line unit, generally designated UL, only one of which has been illustrated in FIG. 1.

Coupling network RT comprises a pair of switching networks RC', RC" operating in parallel under the control of processor sections CC', CC", respectively. Two signal-verification units UCT' and UCT" are inserted between the processor CC and the networks RC', RC", each of these units being connected to both processor sections CC' and CC". A coordinating unit IDG, which may be representative of several such units, is connected by branch leads 13', 13" to respective output leads 12', 12" of networks RC', RC" extending to the associated line units UL; these networks also have input leads 11' and 11" originating at the several line units. Leads 11' – 13' and 11" – 13", serving to convey message signals, have been shown in full lines in FIG. 1, in contrast to other leads physically distinct therefrom which are provided for the transmission of supervisory signals. These other leads, indicated in dotted lines, include a connection 14 between coordinating unit IDG and line unit UL, conductors 15', 17' and 15", 17" transmitting signals from unit IDG to units UCT' and UCT", conductors 16' and 16" carrying signals between these units in the opposite direction, and a pair of 2-way multiples 18', 18" connecting the units UCT' and UCT" with their respective switching networks RC' and RC".

Figure 2:
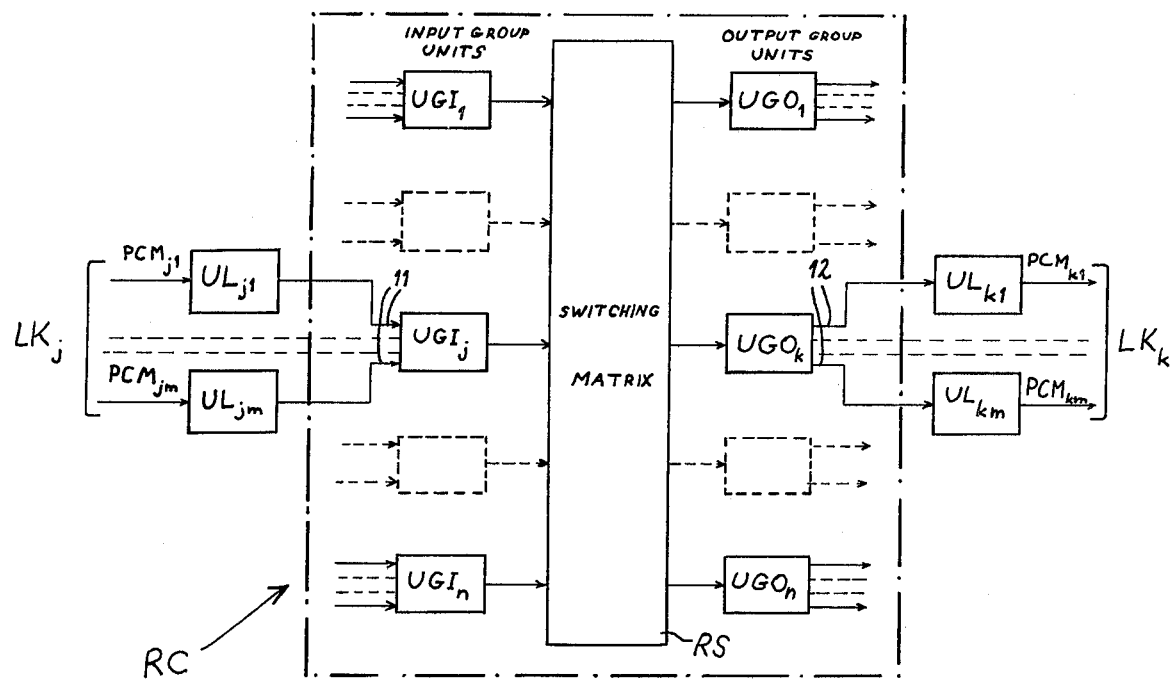
FIG. 2 is a block diagram of a switching network included in the coupling network of FIG. 1.

FIG. 2 shows details of a switching network RC representative of both networks RC', RC" of FIG. 1. Network RC comprises a set of $n$ input group units $UGI_1$–$UGI_n$, respectively assigned to the several PCM links, and a like number of output group units $UGO_1$–$UGO_n$ assigned to the same links; thus, the line units $UL_{jl}$–$UL_{jm}$ of link $LK_j$ transmit their incoming message samples via leads 11 to an input group unit $UGI_j$ whereas the line units $UL_{kl}$–$UL_{km}$ of link $LK_k$ receive their outgoing message signals via leads 12 from an output group unit $UGO_k$. The input and output group units are interconnected through a switching matrix RS more fully illustrated in FIG. 3.

Message samples arriving in a time slot of a PCM frame over, say, channel $PCM_{jl}$ and destined for, say, channel $PCM_{km}$ undergo a temporal shift in input group unit $UGI_j$, are then spatially transferred from link $LK_j$ to link $LK_k$ in switching matrix RS, and experience a further temporal shift in unit $UGO_k$ before being sent out in another time slot of a subsequent frame. Naturally, matrix RS can also be used to switch message samples between different channels of the same link $LK_j$, for example. The operation of matrix RS is controlled by instructions from the processor advantageously stored in a circulating memory so as to become available, at the proper instance, during a transfer interval in which the spatial switching takes place.

Figure 3:
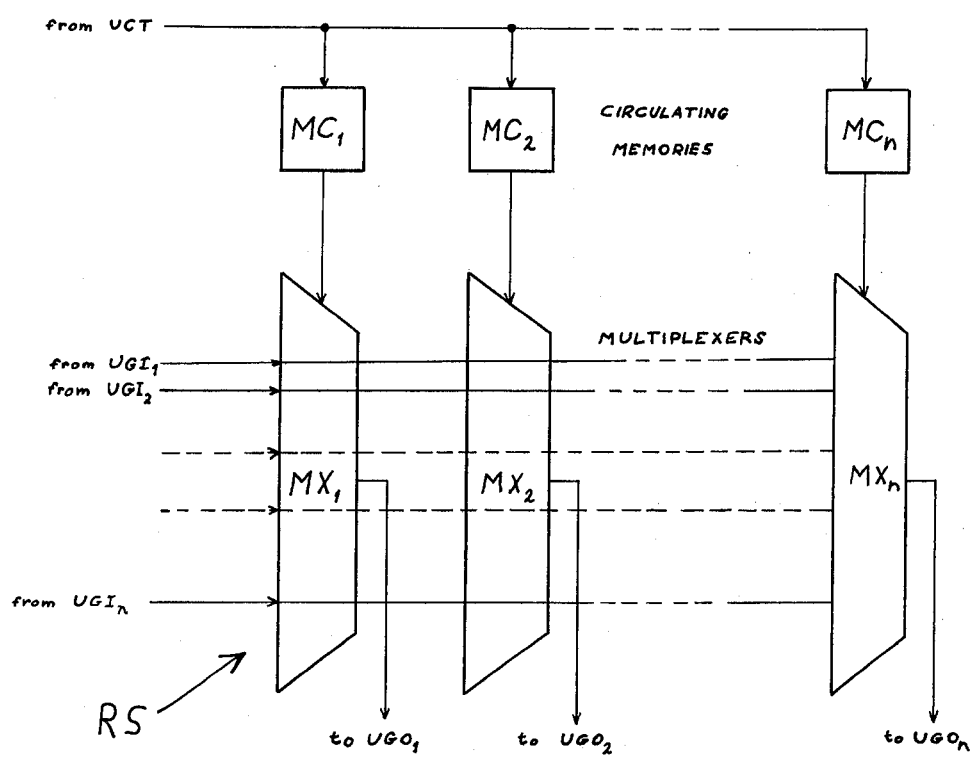
FIG. 3 is a more detailed view of a switching matrix forming part of the network of FIG. 2.

In FIG. 3 we have shown the matrix RS as consisting of a set of $n$ multiplexers $MX_1$, $MX_2$ . . . $MX_n$ with message inputs connected in parallel to output leads from units $UGI_1$, $UGI_2$, . . . $UGI_n$ and with single output leads extending to units $UGO_1$, $UGO_2$, . . . $UGO_n$, respectively. Each of these multiplexers also has a control input receiving switching instructions from respective circulating memories $MC_1$, $MC_2$, . . . $MC_m$ which are loaded from processor CC via the corresponding verification or interface unit UCT.

Figure 4:
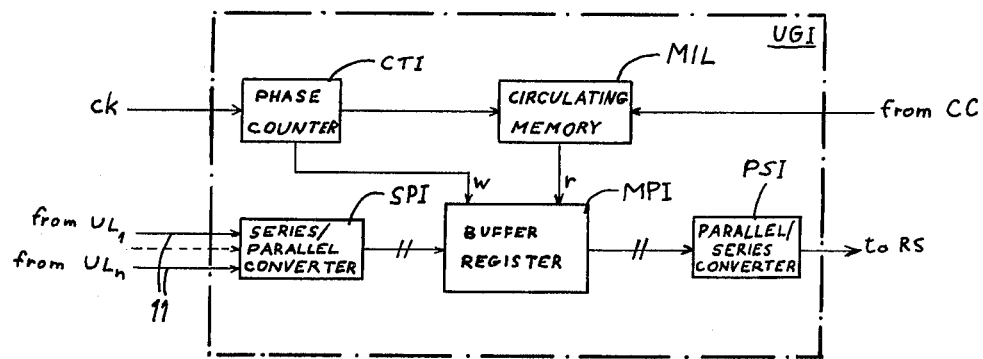
FIG. 4 is a block diagram of an input group unit included in that network.

In FIG. 4 we have shown a representative input group unit UGI serving line units $UL_l$–$UL_m$ of an associated PCM link. Message samples from the several line units, in the form of 8-bit words arriving in respective time slots of a frame, are received by a series/parallel converter SPI which loads each word into a corresponding number of stages of a buffer register MPI for temporary storage. Register MPI has a writing input $w$ stepped by a phase counter CTI which is advanced, in the course of a frame, by locally generated clock pulses $ck$ and whose count is also read to a circulating memory MIL loaded by the processor CC with the addresses (i.e., call numbers) of the intercommunicating subscriber lines. Clock pulses $ck$ establish, within each PCM frame, a multiplicity of phases each substantially coinciding with a time slot of an incoming frame as discussed hereinafter with reference to FIG. 6. Thus, the time position of an incoming word within a frame identifies the channel over which it is received, that time position being correlated by memory MIL with the address of the channel to which the word is to be transmitted. The latter address, therefore, determines the instant at which the word is discharged from register MPI, on instruction from memory MIL fed to a reading input $r$, for delivery to switching matrix RS in its original serial form via a parallel/series converter PSI.

Figure 5:
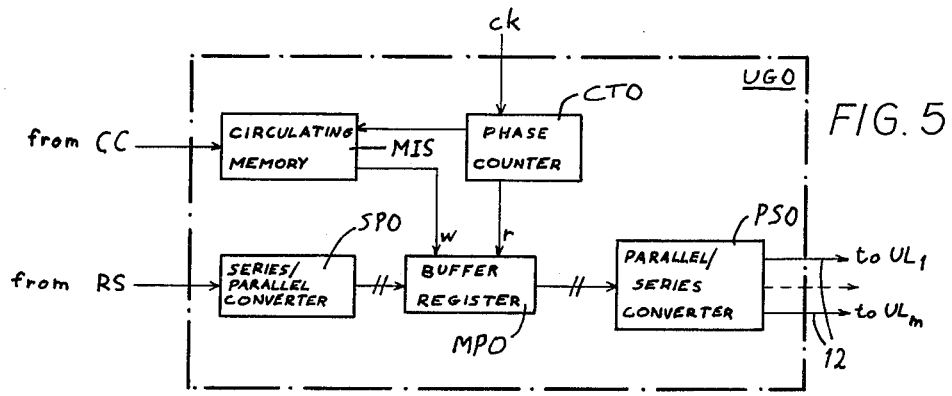
FIG. 5 is a block diagram of an output group unit likewise included in that network.

FIG. 5 illustrates a representative output group unit UGO which is the dual of unit UGI and comprises a buffer register MPO receiving the words transferred from any input group via switching matrix RS, with interposition of a series/parallel converter SPO. The writing input $w$ of register MPO is stepped by the contents of another circulating memory MIS, controlled by processor CC in conformity with memory MIL (FIG. 4), which also receives the reading of a phase counter CTO stepped by clock pulse $ck$ and working into the reading input $r$ of register MPO. After parallel storage in this register, the outgoing word is serially read by way of a parallel/series converter PSO to the designated line unit in the group $UL_l$ – $UL_m$ served by unit UGO.

Figure 6:
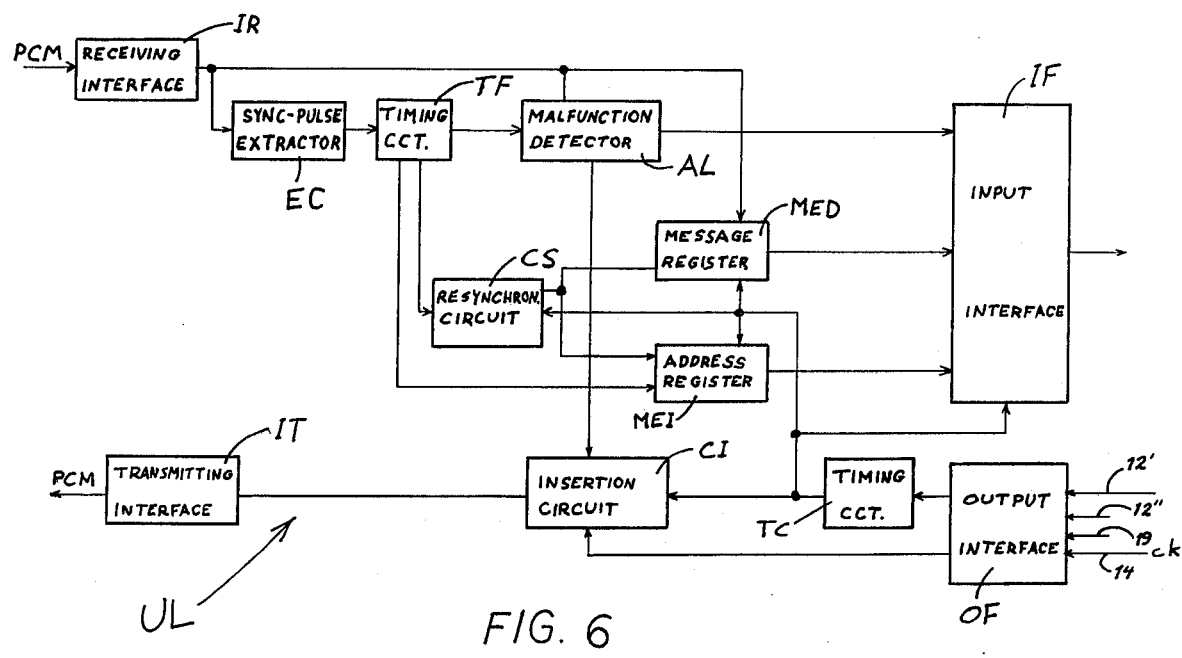
FIG. 6 is a block diagram of a line unit associated with the switching network of FIG. 2.

A typical line unit UL, shown in FIG. 6, has a receiving branch with an interface unit IR, communicating with the associated two-way PCM channel, and a transmitting branch terminating in an interface unit IT which has access to the same channel. Interface unit IR works, on the one hand, into a message register MED and, on the other hand, into a sync-pulse extractor EC which drives a timing circuit TF for reconstituting the original message frame. Clock pulses emitted by circuit TF, in the rhythm of the remote PCM terminal, are fed to an address register MEI and to a resynchronization circuit CS also receiving the locally generated clock pulses $ck$ from another timing circuit TC establishing a similar frame. Theorectically, the two sets of clock pulses should coincide since they are generated at the same nominal frequency of, say, 2,048 Mbit/sec.; in practice, however, these pulse trains will tend to drift apart so that periodic resynchronization of the extracted and the locally generated frames becomes necessary. For this purpose, message register MED and address register MEI are of the flexible type capable of storing twice the number of actual bits per word, or 16 bits for each time slot assigned to a PCM channel. Circuit CS, operating in the manner disclosed in the aforementioned U.S. Pat.

No. 3,928,725, causes the insertion or the skipping of a phase (generally in an initial frame portion reserved for supervisory signals) whenever the deviation of the two sets of clock pulses from each other reaches half a cycle. Thus, the two registers MED and MEI are loaded in the rhythm of the local clock, rather than of the extracted clock pulses, and are unloaded in the same rhythm by the output of timing circuit TC.

A circuit IF, serving as an input interface unit for the associated group unit UGI, is controlled by timing circuit TC to read out the contents of registers MED, MEI as well as a possible alarm signal from a malfunction detector AL responding to the arrival of an error code or an improper message code from the remote terminal. Such an alarm signal is also delivered by detector AL to an insertion circuit CI for retransmission to the originating terminal via interface unit IT in interleaved relationship with outgoing message samples $d$ received from switching network RC′ or RC″ (FIG. 1) via a lead 12′ or 12″ terminating at an output interface unit OF. Clock pulses $ck$ reach the interface unit OF over multiple 14 from network coordinating unit IDG (cf. FIGS. 1 and 8); another lead 19 from that coordinating unit instructs the interface unit OF to transmit either the message samples on lead 12′ or those on lead 12″ to the outgoing branch of line unit UL including interface unit IT.

Figure 7:
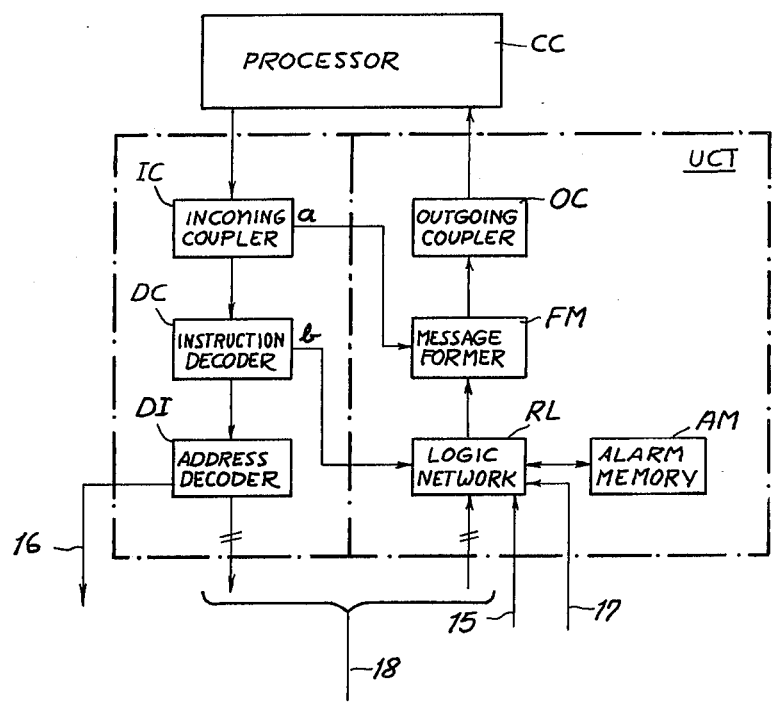
FIG. 7 is a block diagram of a signaling-control unit forming part of the coupling network of FIG. 1.

The interface unit UCT shown in FIG. 7 is representative of the two signaling-control units UCT′, UCT″ depicted in FIG. 1. It, too, has two branches, one of them leading from the processor CC to the associated switching network RC by way of multiple 18 and the other extending from that multiple back to the processor. The first branch includes an incoming coupler IC which checks the instruction words from the processor for accuracy, e.g., with the aid of parity bits as known per se; upon discovering an improper code word, coupler IC sends an alarm signal $a$ to a message former FM in the second branch to request a repetition of the instruction from the processor. Code words of proper format are fed to an instruction decoder DC and to an address decoder DI, the latter identifying the element within network RT to which the instruction applies.

A logic network RL works by way of message former FM and an outgoing coupler OC into processor CO; components DI and RL communicate with coordinating unit IDG (FIGS. 1 and 8) via leads 15, 16 and 17 as more fully described hereinafter. Conductors 15, 17 and 18 may convey to network RL various kinds of alarm information to be forwarded to the processor. Since only one alarm signal at a time can be delivered to the processor, via message former FM, it behooves to assign different priority ratings to the various types of malfunction with the aid of a preference circuit in network RL. Thus, failure of a line unit UL will have the lowest priority since it affects only one transmission channel; a malfunction of a group unit UGI or UGU is more serious, whereas a defect in one of the switching networks RC ranks first in importance. The alarm signal of highest priority will reach the processor first, others being kept waiting in an alarm memory AM connected to network RL.

Memory AM also registers the fact that an alarm signal stored therein has already been sent on to the processor CC to indicate a transition from a normal to a defective state. If the circuit concerned operates irregularly, so that such transitions recur even after the processor has initiated remedial measures such as tracing the error or isolating the affected circuits, the iterative transmission of the same alarm signal to the processor would be useless and could interfere with the feeding of other information to it. Thus, upon receiving an alarm signal, processor CC sends back an acknowledgment code which is detected by decoder DC and sent as a signal $b$ to logic network RL for inhibiting the further transmission of the same type of signal to the processor. Logic network RL, therefore, also includes a code comparator which detects an identity between a signal $b$ and a code stored in memory AM for blocking passage of a like code to message former RL. Another form of signal $b$ (e.g., an inversion of the previous code) may serve to cancel such an alarm signal in memory AM after the malfunction has been corrected.

The priority rating of an alarm signal may be indicated by special bits or by its time position in a period of a frame allocated to the exchange of error information. Alarm signals of the same priority may be transmitted in a random sequence or in the order of their arrival.

Figure 8:
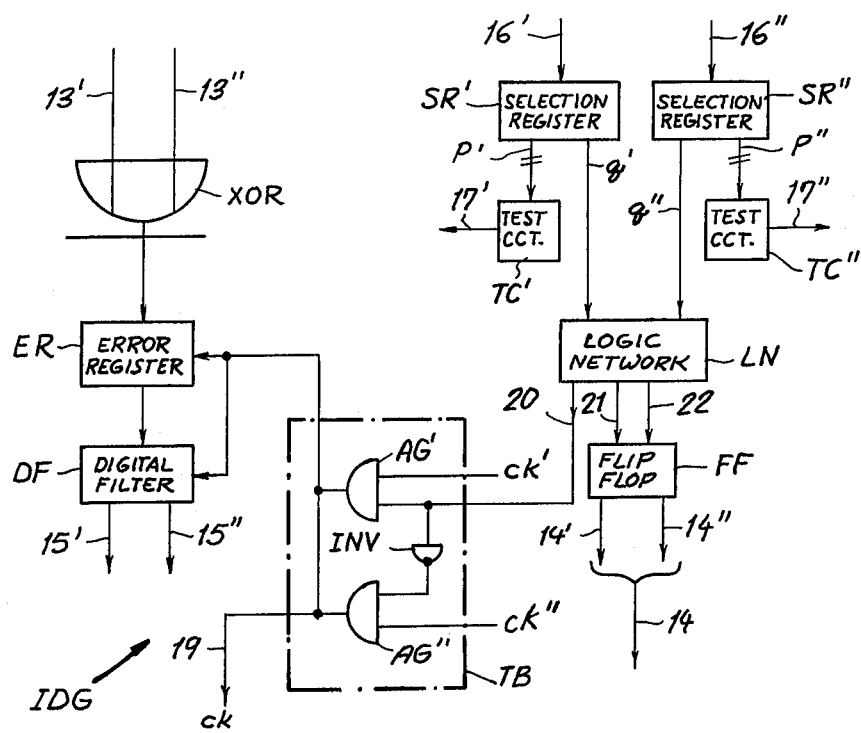
FIG. 8 is a block diagram of a coordinating unit also included in the coupling network.

The coordinating unit IDG shown in FIG. 8, connected between outputs 12′, 12″ of switching networks RC′, RC″ (FIG. 1) by way of branch leads 13′, 13″, comprises an anticoincidence detector in the form of an Exclusive-OR gate XOR for each pair of output group units UGO served by unit IDG. Instructions arriving from processor CC over output leads 16′, 16″ (lead 16 in FIG. 7) of interface units UCT′, UCT″, designating one of the two switching networks RC′, RC″ as the master, are stored in respective selection registers SR′, SR″ and are divided into two parts, i.e., an invariable bit combination fed via multiples $p'$, $p''$ to a pair of test circuits TC′, TC″ and a variable switching code delivered by multiples $q'$, $q''$ to a logic network LN for the purpose of controlling a time base TB and a bistable circuit or flip-flop FF. Test circuits TC′, TC″ have output leads 17′, 17″ (lead 17 in FIG. 7) carrying an alarm signal to logic network RL of unit UCT′ or UCT″ upon detecting an improper instruction indicative of some defect in the signal path IC-DC-DI or in the processor itself. These test circuits could also form part of network LN which may comprise a read-only memory (ROM), possibly of the programmable (PROM) type.

Time base TB comprises a pair of AND gates AG′, AG″ each having an input connected to an output lead 20 of network LN, with interposition of an inverter INV in the case of gate AG″. The two AND gates further receive clock pulses $ck'$ and $ck''$ locally generated in networks RC′ and RC″, respectively; depending on which AND gate is rendered conductive by network LN, pulse train $ck'$ or pulse train $ck''$ reaches the lead 19 extending to output interface unit OF of each associated line unit UL (FIG. 6). Flip-flop FF is concurrently set by that logic network via an output lead 21 or 22 to energize one or the other of its output leads 14′, 14″ forming part of the multiple 14 (FIGS. 1 and 6) which, terminating at the same interface units OF, causes these units to give passage to the message samples from switching network RC′ or RC″ for transmission to the outgoing PCM channels. Thus, for example, network RC′ may be selected as the master so that lead 14′ is energized and clock pulses $ck'$ traverse the time base TB to appear as pulses $ck$ on lead 19; if an alarm condition causes a changeover to network RC″, lead 14″ and clock pulses $ck''$ are selected instead.

Lead 19 also extends to an error register ER, connected to the output of gate XOR, and to a digital filter DF which passes an error signal from register ER to units UCT′, UCT″ via leads 15′ 15″ (lead 15 in FIG. 7)

only if that error recurs in a predetermined number of successive clock cycles. Such an error signal is generated by gate XOR if the two switching networks RC', RC" do not operate in perfect synchronism, i.e., if the bits of the message samples read out from their respective buffer registers MPO (FIG. 5) do not coincide.

It should be noted that networks RC', RC" may be subdivided into a plurality of modular sections or blocks each containing only some of the input and output group units UGI, UGO and associated multiplexers $MX_1 - MX_n$ (FIG. 3), together with at least one coordinating unit IDG. In a preferred system, each block comprises 32 line units UL, eight coordinating units IDG, and eight input group units UGI and output group units UGO (four in each of the associated sections of switching networks RC' and RC").

We claim:

1. A coupling network for establishing temporary connections, under the control of a processor, between intercommunicating channels of a plurality of multichannel TDM links converging at a common junction, comprising:
   a multiplicity of line units divided into a plurality of groups respectively associated with said links, each line unit communicating with a respective channel of the associated link for exchanging incoming and outgoing message samples therewith during a recurrent time slot assigned to the respective channel;
   a pair of substantially identical switching networks;
   a set of input group units in each of said switching networks respectively assigned to said links, each input group unit being connected to all the line units associated with the respective link for receiving and temporarily storing the incoming message samples thereof;
   a set of output group units in each of said switching networks respectively assigned to said links, each output group unit being connected to all the line units associated with the respective link for transmitting outgoing message samples thereto;
   a switching matrix responsive to routing instructions from the processor for forwarding, during a transfer interval, message samples from any input group unit to any output group unit for temporary storage preparatorily to transmission of said message samples;
   coordinating means controlled by said processor for selecting either of said switching networks in establishing a transfer path for message samples therethrough, each line unit being connected in parallel to a pair of associated input group units in the two switching networks and being alternatively connectable by said coordinating means to a pair of associated output group units in said switching networks; and
   a pair of verification units communicating with the processor, said verification units being connected to said switching networks, respectively, and to said coordinating means for facilitating the exchange of information between said switching networks and the processor and for indicating alarm conditions to the processor.

2. A coupling network as defined in claim 1 wherein said transfer interval occurs during a recurrent message frame divided into a multiplicity of phases substantially coinciding with time slots allotted to the PCM channels of each link; each input group unit comprising a first register for incoming message samples, first phase-counting means for sequentially loading the message samples from all the associated line units into said first register, and first memory means for storing timing instructions from the processor controlling the transfer of the message samples from said first register to selected output group units via said switching matrix; each output group unit comprising a second register for outgoing message samples received from said switching matrix, second memory means for storing timing instructions from the processor controlling the loading of the received message samples into said second register, and second phase-counting means for sequentially reading out the message samples from said second register to the line units for which they are destined.

3. A coupling network as defined in claim 2 wherein said message samples are multibit binary words, said first and second registers being of sufficient capacity to store the bits of said words in parallel, each input group unit further comprising a series/parallel converter between said line units and said first register and a parallel/series converter between said first register and said switching matrix, each output group unit further comprising a series/parallel converter between said switching matrix and said second register and a parallel/series converter between said second register and said line units.

4. A coupling network as defined in claim 2, further comprising a source of clock pulses common to all said line units, each line unit including storage means for incoming message samples controlled by said source for reading out the stored message samples to the associated input group unit in response to said clock pulses.

5. A coupling network as defined in claim 4 wherein said message frame contains a synchronization code, each line unit having a receiving branch for incoming message samples terminating at said storage means and a transmitting branch for outgoing message samples connected to the associated output group unit, said receiving branch including extraction means for deriving periodic timing signals from said synchronization code and resynchronization means connected to said extraction means and to said source for modifying the operation of said storage means in the presence of a predetermined deviation of said timing signals from said clock pulses.

6. A coupling network as defined in claim 5, further comprising a malfunction detector connected to said receiving branch for feeding an alarm code to said transmitting branch in response to incorrectly received message frames.

7. A coupling network as defined in claim 1 wherein said switching matrix comprises a plurality of multiplexers each with a single output lead connected to a respective output group unit and with a plurality of input leads connected to respective input group units, corresponding input leads of said multiplexers being all interconnected.

8. A coupling network as defined in claim 7 wherein said switching matrix further includes a set of circulating memories, one for each multiplexer, for storing the routing instructions from the processor controlling the transfer of the message samples from any input lead of each multiplexer to the output lead thereof.

9. A coupling network as defined in claim 1 wherein each of said verification units includes a logical circuitry for assigning different priority ratings to alarm signals received from said switching networks and from said coordinating means for delivery to the processor.

10. A coupling network as defined in claim 9 wherein said coordinating means includes a comparison circuit connected to said switching networks for supplying an error signal to said logical circuitry in response to lack of synchronization between said switching networks.

11. A coupling network as defined in claim 10 wherein said comparison circuit comprises at least one noncoincidence gate with input connections to corresponding output group units of said switching networks.

12. A coupling network as defined in claim 10 wherein said coordinating means includes a pair of test circuits for verifying the correctness of selection signals received from the processor by way of said verification unit, said test circuits having output connections to said logical circuitry.

13. A coupling network as defined in claim 12 wherein each of said switching networks includes a source of clock pulses connected to all said line units, said coordinating means further comprising a gating circuit responsive to said selection signals for giving passage only to the clock pulses originating at the selected switching network.

14. A coupling network as defined in claim 13 wherein said comparison means includes a digital filter stepped by said clock pulses for passing said error signal to said logical circuitry only upon persistence of the lack of synchronization over a predetermined number of clock cycles.

15. A coupling network as defined in claim 12 wherein said coordinating means further comprises bistable means connected to said test circuits for connecting the output group units of either of said switching networks to said line units.

16. A coupling network as defined in claim 9 wherein each of said verification units includes an inhibiting circuit responsive to an alarm-acknowledging signal from the processor for preventing the forwarding of further alarm signals from said logical circuitry to the processor.

17. A coupling network as defined in claim 1 wherein each of said verification units includes a response circuit for sending a repetition request to the processor upon receiving improper routing instructions therefrom.

* * * * *